T. B. HUESTIS.
COMBINATION TOOL.
APPLICATION FILED APR. 30, 1908.

938,583.

Patented Nov. 2, 1909.

WITNESSES:
Chas. H. Luther
Ada E. Fagerty

INVENTOR:
Thomas B. Huestis
by Joseph H. Miller
ATTORNEY.

UNITED STATES PATENT OFFICE.

THOMAS B. HUESTIS, OF BRISTOL, RHODE ISLAND.

COMBINATION-TOOL.

938,583.

Specification of Letters Patent.

Patented Nov. 2, 1909.

Application filed April 30, 1908. Serial No. 430,094.

*To all whom it may concern:*

Be it known that I, THOMAS B. HUESTIS, a citizen of the United States, residing at Bristol, in the county of Bristol and State of Rhode Island, have invented a new and useful Improvement in Combination-Tools, of which the following is a specification.

This invention has reference to an improvement in tools and more particularly to an improvement in a combination tool for pneumatic tire valves.

In the use of pneumatic tire valves it is necessary at times to remove the internal parts of the valve, also the outer end of the valve stem is liable to receive injury from various causes. These injuries generally cause damage to the extreme outer end of the valve stem and also to the internal and external screw threads at the end of the valve stem.

The object of my invention is to provide a combination tool for automobilists' use on pneumatic tire valves, whereby the internal parts of the valve may be easily removed from the valve stem, the end of the valve stem trued and the internal and external screw-threads re-cut when required, all by the use of the one tool.

A further object of my invention is to construct a combination tool for the above purposes in as simple and compact a form as possible, whereby the tool may be easily carried in the pocket or requires little room in the tool-kit.

My invention consists in the peculiar and novel construction of a combination tool for use on pneumatic tire valves, said tool having means for removing the internal parts of the valve, means for truing the end of the valve stem, means for re-cutting the internal screw-threads in the end of the stem, means for re-cutting the external screw-threads on the end of the stem, and details of construction as will be more fully set forth hereinafter and claimed.

Figure 1:
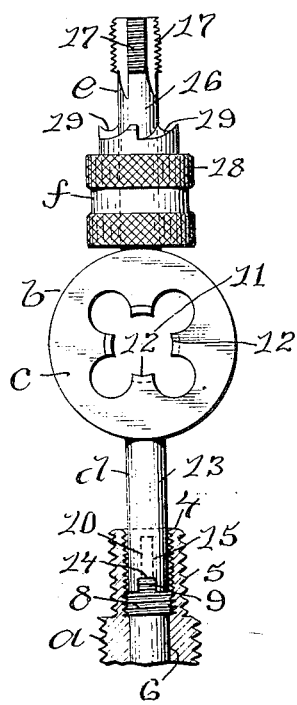
Figure 2:
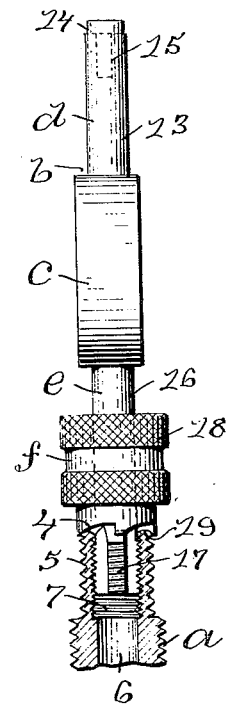
Figure 3:
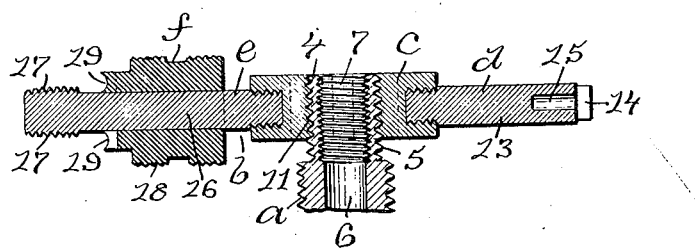

Figure 1 is a face view of my improved combination tool, showing the tool in its operative position for removing the internal parts of a pneumatic tire valve, the outer end of which is shown in section. Fig. 2 is a side view of the tool, showing the same in its operative position for truing the end of a valve stem or for re-cutting the internal screw-threads in the end of the valve stem, shown in section, and Fig. 3 is a longitudinal sectional view through the tool, showing the tool in its operative position on the end of a valve stem (shown in section) for re-cutting the external screw-threads on the valve stem.

In the drawings, *a* indicates part of a pneumatic tire valve showing the outer end in longitudinal section, and *b* my improved combination tool which consists of a die *c* forming the body of the tool, a key *d* forming one arm of the die, a tap *e* forming the other arm of the die, and a rotary cutter *f* on the stem of the tap *e*. The part *a* of the valve consists of the outer end, having the rounded extreme end 4, the external screw-threads 5 on the end of the stem, the central bore 6, the internal screw-threads 7 in the end of the stem, the screw-threaded valve member 8 in screw-thread engagement with the internal screw-threads 7 and having the central transverse boss 9 on its outer end and the internal valve stem 10 which extends outwardly through the member, 8, as shown in broken lines in Fig. 1, for opening the valve, all of which is of the usual construction of pneumatic tire valves and is shown to illustrate the different operations of the tool. The die *c* of the tool is preferably circular in form and has the usual central opening 11 for the end of the valve stem and the screw-threaded cutting portions 12 12, the pitch of which corresponds to the pitch of the external screw-threads 5 on the valve stem. The key *d* is in the form of a round rod 13 having the central transverse slot 14 in the end for the boss 9 on the valve member 8, the hole 15 extending centrally in from the slot 14 for the internal valve stem 10, and is secured radially to the die *c* by screw-threads or other means and forms one arm of the die. The tap *e* consists of a round stem 16 having the screw-threaded cutting portions 17 17 on its outer end the pitch of which corresponds with the pitch of the internal screw-threads 7 in the valve stem. The inner end of the stem 16 is secured to the die *c* on a line with the key *d* and forms the opposite arm of the die. The rotary cutter *f* is cylindrical in form and has the knurled periphery 18 and the cutting teeth 19 19 shaped to true the rounded end 4 of the valve stem. The cutter is rotatably and reciprocally supported on the stem 16 of the tap *e* and is prevented from becoming detached from the stem by reason of its movement being restricted by the cutting portions 17, and the die *c*, which latter forms a handle for the stem.

In the operation of the tool the internal parts of the valve are removed by inserting the key d into the end of the valve stem and bringing the slot 14 in the end of the key into engagement with the boss 9 on the valve member 8, as shown in Fig. 1, when the key d is turned to the left to unscrew the valve member 8 and remove the same with the internal parts of the valve which are usually attached to the member 8. The internal screw-threads 7 in the valve stem are re-cut or re-threaded by the operation of the tap e in the valve stem, as shown in Fig. 2. The rounded end 4 of the valve stem is trued by screwing the tap e into the valve stem, forcing the teeth 19 19 on the cutter f against the end of the valve stem, as shown in Fig. 2, and turning the cutter f on the stem e. The external screw-threads 5 on the valve stem are re-cut or re-threaded by the operation of the die c on the valve stem, as shown in Fig. 3.

It is evident that the tool may be modified in details of construction so as to adapt the same to other forms of pneumatic tire valves, without materially affecting the spirit of my invention.

Having thus described my invention, I claim as new and desire to secure by Letters Patent;—

A tool for cutting the threads in valve stems and truing the outer end thereof composed of a shank of uniform diameter having a plain surface, cutting parts on one end of said shank forming a shoulder at the inner end thereof, a cutter slidably mounted on said shank above said cutting parts and being non-rotatable with the shank, and a handle for rotating said shank secured to the opposite end of the shank, said handle at its inner end forming a shoulder, said cutter being confined on said shank by virtue of said shoulders and having its sliding movement on said shank limited thereby, and being capable of rotatable movement independently of said shank.

In testimony whereof I have signed my name to this specification in the presence of two subscribing witnesses.

THOMAS B. HUESTIS.

Witnesses:
ADA E. HAGERTY,
J. A. MILLER.